(No Model.)
T. RICHARDS.
SAW SETTING DEVICE.
No. 362,181. Patented May 3, 1887.
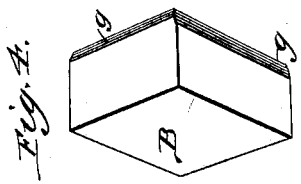
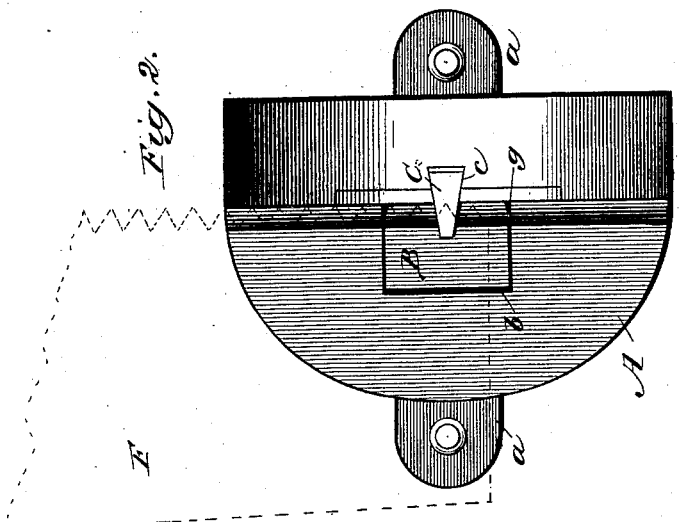
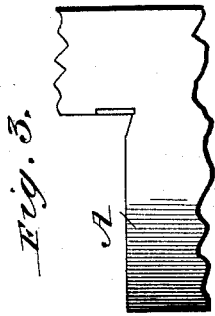
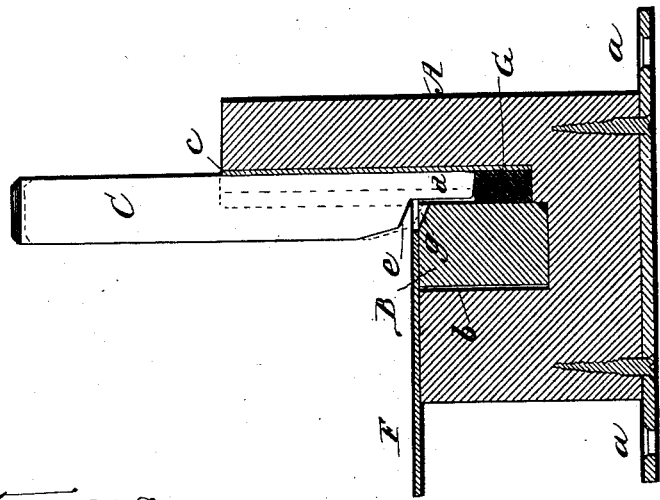
Witnesses,
W. Rossiter
Otto Lubkert
Inventor
Thomas Richards
By Wm H Lotz
Atty.

United States Patent Office.

THOMAS RICHARDS, OF CHICAGO, ILLINOIS, ASSIGNOR OF ONE-HALF TO LEVI PRITCHARD, OF SAME PLACE.

SAW-SETTING DEVICE.

SPECIFICATION forming part of Letters Patent No. 362,181, dated May 3, 1887.

Application filed January 15, 1887. Serial No. 224,487. (No model.)

*To all whom it may concern:*

Be it known that I, THOMAS RICHARDS, a citizen of the United States of America, residing at Chicago, in the county of Cook and State of Illinois, have invented certain new and useful Improvements in Saw-Setters, of which the following is a specification, reference being had therein to the accompanying drawings.

This invention relates to devices for slanting the teeth of a saw laterally from the plane of the same alternately to the right and left, in order that the kerf may be wider than the thickness of the blade and friction be reduced, and it has been my object to provide a tool or implement that is simple in its construction and handy in its use; and for that purpose my invention consists of the novel devices and combinations of devices hereinafter described and specifically claimed.

In the accompanying drawings, Figure 1 represents a sectional elevation, and Fig. 2 a plan, of the whole device; Fig. 3, a partial side elevation of the frame, and Fig. 4 a perspective view of the die or anvil.

Corresponding letters in the several figures of the drawings designate like parts.

A denotes the frame, of wood or malleable iron, with flanges or lugs $a$ fixed thereto for securing it upon the work-bench by wood-screws. This frame A has a socket, $b$, for inserting the anvil B, and an upward extension dovetailed vertically in the side toward anvil B for guiding the setter-punch C.

The anvil B is a square block of steel, having edges $g$, of different chamfers, to suit different sizes of saw-teeth. This anvil-block fits snugly into the socket $b$, and when inserted is flush with the surface of the frame, and it is so fitted that either one of four sides may be on top, each such side having a different width of chamfer, $g$.

The dovetail groove $c$ extends to near the bottom of socket $b$, and in it is fitted and guided the setter-punch C, shaped parallelly dovetail, with its bottom end, $d$, reduced to enter behind the anvil-block, and with its offset or shoulder $e$ formed to the chamfer of the anvil-block. Into the bottom of the dovetail guide-groove $c$ is inserted a piece of rubber or other elastic material, upon which the end of the setter-punch will rest, and which with each hammer-stroke upon such setter-punch will be compressed and will raise the punch again after it is released sufficiently to clear the teeth of the saw F.

Several setter-punches C will be required, one for each chamfer $g$, of proper shoulder-length.

For setting the teeth of a saw, it is rested upon the surface of frame A, with the tooth to be set below shoulder $e$ of setter-punch C, when, with a light hammer-stroke upon such punch, such tooth will be bent to assume the proper angle, and so every alternate tooth is moved under the setter-punch and treated in like manner; and then the saw is turned upon its other face, and the intermediate alternate teeth are set in the same manner.

The advantages of the device are that the teeth of a saw can be set therewith all uniformly to the same angle without any skill or close attention to the manipulation.

What I claim is—

The combination, with frame A, having socket $b$ and dovetail groove $c$, of anvil-block B, provided with chamfer $g$, setter-punch C, having narrowed end $d$ and beveled shoulder $e$, and elastic piece G, all substantially as set forth, to operate as specified.

In testimony whereof I affix my signature in presence of two witnesses.

THOMAS RICHARDS.

Witnesses:
WM. H. LOTZ,
OTTO LUBKERT.